Patented Jan. 9, 1923.

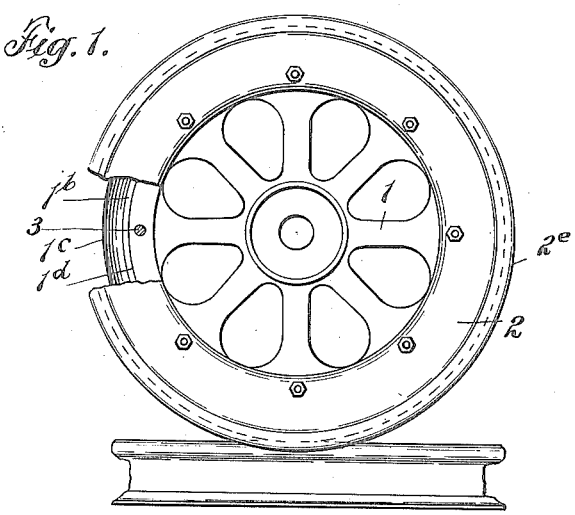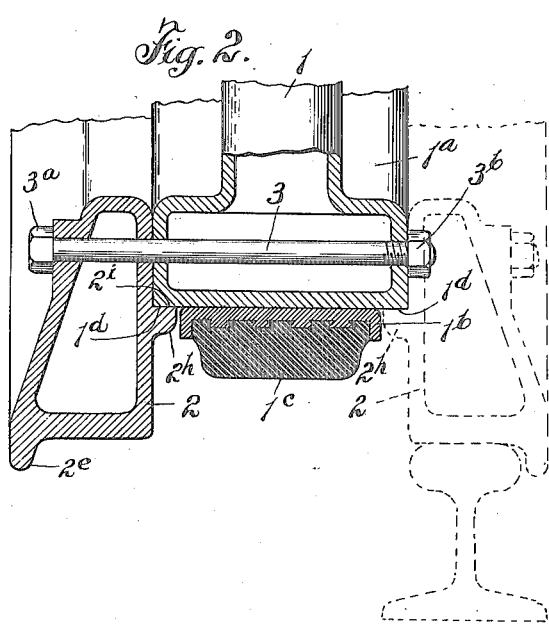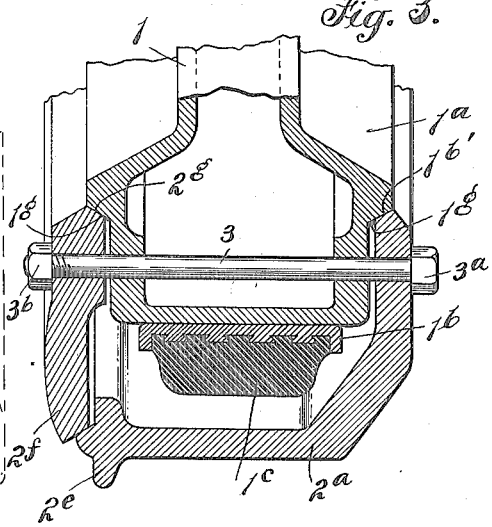

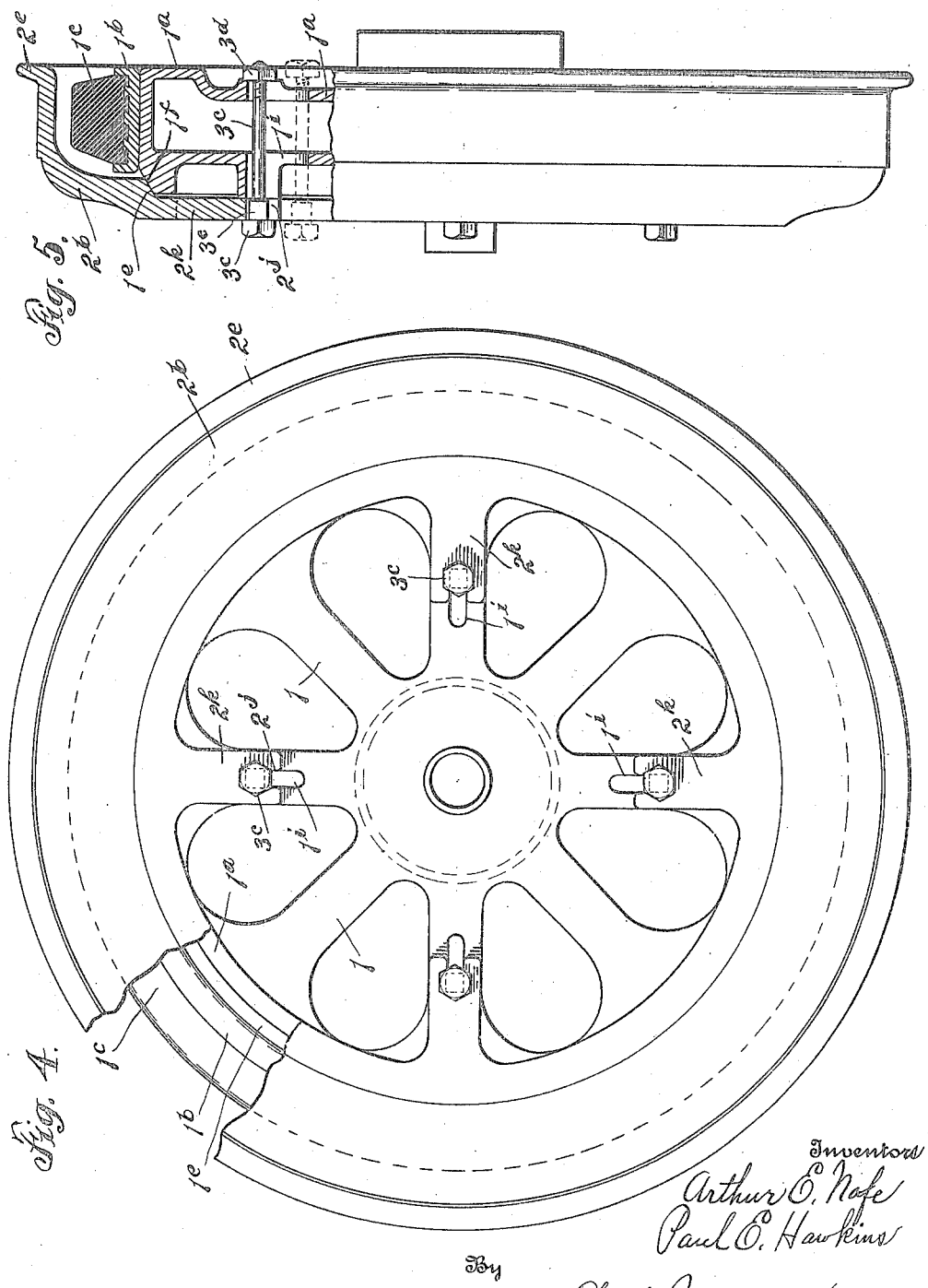

1,441,941

UNITED STATES PATENT OFFICE.

ARTHUR E. NAFE, OF BEREA, AND PAUL E. HAWKINS, OF CLEVELAND, OHIO.

VEHICLE WHEEL.

Application filed April 4, 1922. Serial No. 549,398.

*To all whom it may concern:*

Be it known that we, ARTHUR E. NAFE and PAUL E. HAWKINS, citizens of the United States, residing at Berea and Cleveland, respectively, in the county of Cuyahoga and State of Ohio, have invented certain new and useful Improvements in Vehicle Wheels, of which the following is a specification.

Our invention relates to improvements in vehicle wheels, and more particularly to that type or class adapted to operate either as a track wheel or as a road wheel on rail or road vehicles to meet corresponding requirements.

The primary object of the invention is to provide a generally improved combined road and track wheel which will be exceedingly simple in construction, cheap of manufacture, and efficient in use.

A further and very important object is the provision of an improved wheel of this class in which the rail and road wheel units or tread sections are so attached and supported relative to each other through the medium of improved thrust receiving abutments, as to relieve the attaching or connecting elements of substantially all or at least a major portion of the strains and stresses arising in actual service and irrespective of whether used as a rail wheel for a rail vehicle or as a road wheel for use in connection with a road vehicle.

If desired our improvements may be readily incorporated in or applied to rail or road wheels of conventional form, the tread portions or sections being brought into proper proximity and as shown in some of the embodiments of our invention may be of different diameters and off-set with respect to each other so as to operate singly without danger of interference or injury to the other.

With the above mentioned and other ends in view, the invention consists in the novel construction, arrangement and combination of parts, hereinafter described, illustrated in some of its embodiments in the accompanying drawings and particularly pointed out in the appended claims.

Referring to the drawings, forming a part of this specification, Figure 1 is a side elevation of a cushioned road wheel equipped with a rail wheel or flanged tread section constructed, mounted, and connected in accordance with this invention, and shown in use as a rail wheel.

Fig. 2, an enlarged fragmentary cross sectional view of the same.

Fig. 3, a similar view of a modified form equipped as a rail wheel and in which the detachable flanged rail tread portion or section protects the resilient tread or tire of the road wheel.

Fig. 4, a side elevation of a further modification embodying another form of wheel tire protective rail wheel unit or tread section.

Fig. 5, an edge view of the same, partly in central cross section.

Similar numerals of reference designate like parts throughout all the figures of the drawings.

The general body and hub portions of the road and track wheel or section may be of any suitable and conventional form.

The road wheel may be provided with suitable spokes 1, terminating in a suitable wheel felly $1^a$, the latter, in the different forms shown in the drawings being provided with demountable tire carrying rims $1^b$, and tires $1^c$, the latter, in the present instance, being of the solid rubber or resilient type.

The rail wheel section or unit may be of any suitable and convenient form or type, as for example,—in the specific form of a ring shaped tread section or unit 2, attached directly to the side of the wheel felly $1^a$, as shown in Figs. 1 and 2 of the drawings, or in the form of overhanging tire protective tread sections or units $2^a$ and $2^b$, respectively, as shown in Fig. 3 and in Figs. 4 and 5, respectively. If desired, however, the rail wheel section or unit may take the form of a complete rail wheel $2^c$, as shown in Fig. 6 of the drawings, and in which instance, if desired, the road wheel may be of the demountable type mounted upon an extended hub $2^d$, of the rail wheel.

The rail wheel sections or units are provided, irrespective of their specific form as above described, with suitable tread flanges $2^e$. The overhanging tire protective tread section $2^a$ may completely cover and enclose the tire $1^c$, as in Fig. 3 and in which instance, a suitable supplemental rim $2^f$, is provided at one side of the wheel felly $1^a$, or if desired, the overhanging tread section may take the form shown at 2$^b$ in Figs. 4 and 5, and in which instance it will be observed that the tread section 2$^b$ is open at one side.

As a means of detachably connecting the road and rail wheel units or sections together by means of suitable attaching elements and particularly as a means of relieving such attaching or connecting elements of radial thrusts or shearing action and bringing such units or sections into interlocking relation through the medium of suitable thrust receiving abutments, the road wheel unit is provided with a suitable annular thrust receiving abutment and the flanged rail wheel section or unit is provided with a corresponding abutment to interlock with the annular abutment on the road wheel to directly receive the thrust and stresses of actual service when either one of the wheel sections is in active use. In the form shown in Figs. 1 and 2 such annular thrust receiving abutment is in the specific form of an extension 1$^d$, at either side of the demountable tire carrying rim 1$^b$, while in the form shown in Figs. 4 and 5 of the drawings said annular abutment is in the specific form of an inclined annular shoulder 1$^e$, adapted to engage with a similarly shaped inclined annular shoulder 1$^f$, of the overhanging tread section or unit 2$^b$. In the form shown in Fig. 3 the thrust receiving abutments are in the specific form of inclined annular shoulders 1$^g$, adapted to co-operate with and engage with similarly shaped bearing portions or shoulders 1$^{b'}$ and 2$^g$, of the overhanging tread section 2$^a$ and the supporting rim 2$^f$, respectively. In the form shown in Figs. 1 and 2 of the drawings the ring shaped rail wheel sections or units 2 are provided with laterally extending flanges 2$^h$, said flanges 2$^h$ forming interlocking shoulders 2$^i$, extending over and seated upon the abutment 1$^d$ formed by the extension so that the ring shaped rail wheel sections or units 2 may be mounted on either side of the road wheel felly as indicated by full and dotted lines in Fig. 2 of the drawings.

As a means of quickly and effectively attaching the rail wheel sections or units 2 and 2$^a$ to the road wheel sections or units the felly portions 1$^a$ of the latter are provided with suitable openings and the sections 2 and 2$^a$ are provided with suitable registering openings to receive and contain suitable fastening elements 3, said fastening or attaching elements 3, in the present instance, being in the specific form of cross bolts provided with heads 3$^a$ at one side and nuts 3$^b$, at the other.

In the form shown in Figs. 4 and 5 of the drawings the attaching or fastening elements are in the specific form of bolts 3$^c$, provided with suitable heads and nuts 3$^d$, said bolts 3$^c$ being adapted to be adjusted in suitable guide slots 1$^i$, in the spoke members of the road wheel and being adapted to enter suitable slots 2$^j$, in inwardly extending arms 2$^k$, of the overhanging tire protective tread section 2$^b$.

In the form shown in Figs. 4 and 5 of the drawings when it is desired to detach the overhanging tread section or unit 2$^b$ from the road wheel the nuts 3$^d$ on the attaching elements 3$^c$, may be loosened and the attaching elements or bolts moved down to the dotted line position shown in Fig. 5 of the drawings whereby the tread sections or units 2$^b$ may be readily lifted off, the angular or square shaped shoulders 3$^e$, preventing any rotation of the attaching bolts 3$^c$ when the nuts 3$^d$ are turned forwardly or backwardly in the fastening and unfastening operation.

It has been thought unnecessary to illustrate in the drawings a vehicle for operating under the conditions to be met, since such vehicle in all of its details excepting the wheels, may be of any approved form, and, furthermore, it will be obvious that the particular problem to be met arises from a requirement for a self-propelled vehicle which may be operated on rails for a distance, and, at the terminal, be propelled off the rails on a road surface for a continued operation through any desired zone.

Having thus described some of the embodiments of our invention, without having attempted to set forth all the forms in which it may be made, or all the modes of its use, what we claim and desire to secure by Letters Patent, is,—

1. A vehicle wheel, comprising a rail wheel unit provided with a flanged tread, a cushioned road wheel unit of less diameter, means for connecting said rail and road wheel units together, and annular interlocking abutments for relieving said connecting means of radial thrusts between said wheel units during service.

2. A vehicle wheel, comprising a rail wheel unit provided with a flanged tread, a cushioned road wheel unit of less diameter provided at one side with a shoulder, means for detachably connecting said wheel units together, and means for relieving such connecting means of radial thrust or shearing action between said wheel units.

3. A combination road and track wheel, comprising a road wheel provided with an annular shoulder, a flanged rail wheel provided with a companion shoulder seated on and interlocking with said first mentioned shoulder and extending beyond the periphery of said road wheel, and transverse fastening elements extending through and removably securing said wheels in assembled interlocked relation.

4. A combination road and track wheel, comprising a road wheel provided at its sides with annular thrust receiving shoulders, a flanged rail wheel provided with thrust receiving companion shoulder portions seated on and interlocking with said first mentioned shoulders, said rail wheel being larger in diameter to extend beyond the periphery of said road wheel and transverse fastening bolts extending between and removably securing said wheels in interlocked thrust receiving relation with respect to said shoulders.

5. In a combined road and track wheel, a cushioned tread section adapted to run on a road surface, a rail tread section detachably secured thereon at one side and provided with a flange projecting beyond the outer periphery of said cushioned tread section and adapted to engage the rails of the track, and circumferential shoulders between said sections adapted to interlock and prevent relative radial movement and relieve the fastening element of any shearing action.

6. In a combined road and track wheel, a cushioned wheel section adapted to run on a road surface, a rail wheel section at one side and provided with a flange extending beyond the periphery of said cushioned wheel section to engage the rails of the track to elevate and protect said cushioned wheel section, fastening elements between said sections, and circumferential shoulders between said sections interlocking to prevent relative movement and relieve the fastening elements of relative stresses in service.

7. In a vehicle wheel, a road wheel provided with a resilient tire and having an annular thrust receiving abutment at one side, a flanged rail wheel larger in diameter than said road wheel and provided at one side with a companion abutment receiving and interlocking with said annular thrust receiving abutment of said road wheel, and transverse fastening elements extending between said wheels holding the latter in seated interlocking relation and preventing relative circumferential movement therebetween.

8. In a combined road and track wheel, a road wheel unit provided with a resilient tread portion and having an annular thrust receiving abutment, a track wheel unit provided with a flanged tread portion extending beyond the periphery of said road wheel and having at one side an annular thrust receiving abutment interlocking with said annular abutment of said road wheel unit, and attaching elements for detachably securing said wheel units together in seated interlocking relation whereby said abutments relieve said fastening elements of shearing action.

9. In a combined road and track vehicle wheel, a road wheel unit provided with a resilient tread portion and having at one side an annular thrust receiving abutment, a track wheel unit provided with a flanged tread portion extending beyond and protecting said resilient tread portion and having at one side an annular thrust receiving abutment adapted to interlock with said abutment of said road wheel unit, and attaching elements for detachably securing said wheel units together in seated interlocking relation whereby said abutments relieve said fastening elements of shearing action.

10. In a vehicle wheel, a road wheel provided with a felly affording an annular abutment, a rail wheel section at one side of said felly and provided with an annular abutment engaging and interlocking with said annular abutment of said felly, said rail wheel section being provided with a rail flange and projecting beyond the outer periphery of said road wheel, and cross bolts extending transversely through said road and rail wheel sections whereby the latter are secured in seated relation to each other and said bolts are relieved of shearing action therebetween.

In testimony whereof we have affixed our signatures.

ARTHUR E. NAFE.
PAUL E. HAWKINS.